US006822223B2

(12) United States Patent
Davis

(10) Patent No.: US 6,822,223 B2
(45) Date of Patent: Nov. 23, 2004

(54) METHOD, SYSTEM AND DEVICE FOR PERFORMING QUANTITATIVE ANALYSIS USING AN FTMS

(75) Inventor: Dean Vinson Davis, Bartlesville, OK (US)

(73) Assignee: Siemens Energy & Automation, Inc., Alpharetta, GA (US)

(*) Notice: Subject to any disclaimer, the term of this patent is extended or adjusted under 35 U.S.C. 154(b) by 5 days.

(21) Appl. No.: 10/649,390

(22) Filed: Aug. 27, 2003

(65) Prior Publication Data

US 2004/0113063 A1 Jun. 17, 2004

Related U.S. Application Data

(60) Provisional application No. 60/406,793, filed on Aug. 29, 2002.

(51) Int. Cl.[7] .......................... H01J 49/34; H01J 49/26; B01D 59/44

(52) U.S. Cl. ....................... 250/282; 250/281; 250/280; 250/291; 250/293

(58) Field of Search ................................ 250/282, 281, 250/290, 291, 293

(56) References Cited

U.S. PATENT DOCUMENTS 4,945,234 A * 7/1990 Goodman et al. .......... 250/291
5,248,882 A * 9/1993 Liang ......................... 250/291
5,264,697 A * 11/1993 Nakagawa et al. ......... 250/291
6,369,382 B1 4/2002 Ito et al. ...................... 250/281
6,680,203 B2 * 1/2004 Dasseux et al. .............. 436/86

OTHER PUBLICATIONS

PCT International Search Report—PCT/US 03/26786 Date of Mailing—May 14, 2004.

"Automation of a Fourier Transform ion Cyclotron Resonance Mass Spectrometer for Acquisition, Analysis, and E–Mailing of High–Resolution Exact–Mass Electrospray Ionization Mass Spectral Data"; N. Huang, M. Siegel, G. Kruppa and F. Laukien; Jun. 21, 1999; 1999 American Society for Mass Spectrometry.

* cited by examiner

*Primary Examiner*—Nikita Wells

(57) ABSTRACT

Certain exemplary embodiments provide a method for performing repeated quantitative analysis using an FTMS. The method can comprise a plurality of potential activities, some of which can be automatically, repeatedly, and/or nestedly performed, and some of which follow. From at least one predetermined sample source, a sample can be obtained and provided to an FTMS. At least one variable for the FTMS can be optimized. A plurality of outputs can be acquired from the FTMS. An identity of at least one predominant ionic component of the sample can be ascertained. A quantity of the at least one predominant ionic component can be determined.

24 Claims, 12 Drawing Sheets

METHOD, SYSTEM AND DEVICE FOR PERFORMING QUANTITATIVE ANALYSIS USING AN FTMS

CROSS-REFERENCE TO RELATED APPLICATIONS

This application claims priority to, and incorporates by reference herein in its entirety, pending provisional application Serial No. 60/406,793 filed Aug. 29, 2002.

BACKGROUND

U.S. Pat. No. 3,937,955 (Comisarow), titled "Fourier transform ion cyclotron resonance spectroscopy method and apparatus", allegedly cites that a "gas sample is introduced into an ion cyclotron resonance cell enclosed in a vacuum chamber, and ionized. A magnetic field constrains ions to circular orbits. After an optional delay adequate to allow ion-molecule reactions to occur, a pulsed broad-band oscillating electric field disposed at right angles to the magnetic field is applied to the ions. As the frequency of the applied electric field reaches the resonant frequency of various ions, those ions absorb energy from the field and accelerate on spiral paths to larger radius orbits. The excited motion is sensed and digitized in the time domain. The result of the digitization is Fourier transformed into the frequency domain for analysis. If desired, a sequential series of pulsed broad-band oscillating fields can be applied and the resulting change in motion sensed, digitized and accumulated in a sequential manner prior to Fourier transformation." See Abstract.

U.S. Pat. No. 5,264,697 (Nakagawa), titled "Fourier transform mass spectrometer", allegedly cites that the "present invention relates to a Fourier transform mass spectrometer suitable for analysis of a particular component of a sample gas made of known components, which is adapted so as to prevent the high-frequency electric field applied to the high vacuum cell from deviating due to a variation in the long cycle of the static magnetic field applied to the high vacuum cell, which is characterized in that the variation in the long cycle of the magnetic field applied is detected as a deviation in the ion cyclotron resonance frequency of the particular component and the high frequency for forming the high-frequency electric field is made variable in accordance with the variation in the ion cyclotron resonance frequency." See Abstract.

U.S. Patent Application No. 20020190205 (Park), titled "Method and apparatus for fourier transform mass spectrometry (FTMS) in a linear multipole ion trap" allegedly cites a "means and method whereby ions from an ion source can be selected and transferred via a multipole analyzer system in such a way that ions are trapped and analyzed by inductive detection. Ions generated at an elevated pressure are transferred by a pump and capillary system into a multipole device. The multipole device is composed of one analyzing section with two trapping sections at both sides. When the proper voltages are applied, the trapping sections trap ions within the analyzing region. The ions are then detected by two sets of detection electrodes." See Abstract.

SUMMARY

Certain exemplary embodiments provide a method for automatically optimizing an FTMS. The method can comprise a plurality of potential activities, some of which can be automatically, repeatedly, and/or nestedly performed, and some of which follow. A composite amplitude relating to an FTMS spectral output signal for each of a plurality of FTMS samples can be obtained, each of the samples having an substantially similar number of molecules. The FTMS variable can be changed repeatedly and the composite amplitude re-obtained until a value of an optimization parameter substantially converges, the optimization parameter being a function of the composite amplitude.

Certain exemplary embodiments provide a method for performing repeated quantitative analysis using an FTMS. The method can comprise a plurality of potential activities, some of which can be automatically, repeatedly, and/or nestedly performed, and some of which follow. From at least one predetermined sample source, a sample can be obtained and provided to an FTMS. At least one variable for the FTMS can be optimized. A plurality of outputs can be acquired from the FTMS. An identity of at least one predominant ionic component of the sample can be ascertained. A quantity of at least one predominant ionic component can be determined.

BRIEF DESCRIPTION OF THE DRAWINGS

A wide array of potential embodiments can be better understood through the following detailed description and the accompanying drawings in which.

DETAILED DESCRIPTION

Figure 1:
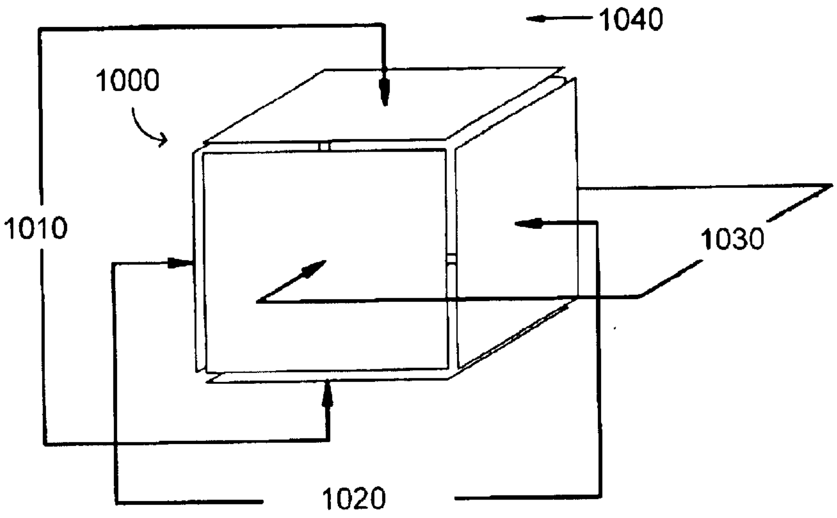
FIG. 1 is simplified diagram of an exemplary embodiment of a trapped ion cell.

Mass spectrometry, also called mass spectroscopy, is an instrumental approach that allows for the mass measurement of molecules. Nearly every mass spectrometer includes: a vacuum system; a sample introduction device; an ionization source; a mass analyzer; and an ion detector. A mass spectrometer determines the molecular weight of chemical compounds by ionizing, separating, and measuring molecular ions according to their mass-to-charge ratio (m/z) and/or the ions' "molecular mass" (which is sometimes simply referred to as an ion's "mass"). The ions are generated in the ionization source by inducing either the loss or the gain of a charge (e.g. electron ejection, protonation, or deprotonation). Once the ions are formed in the gas phase they can be directed into a mass analyzer, separated according to mass and then detected. The result of ionization, ion separation, and detection is a mass spectrum that can provide molecular weight or even structural information.

Mass spectrometers can be useful in a wide range of applications in the analysis of inorganic, organic, and bio-organic chemicals. Among the many examples include dating of geologic samples; sequencing of peptides and proteins; studies of noncovalent complexes and immunological molecules; DNA sequencing; analysis of intact viruses; drug testing and drug discovery; process monitoring in the petroleum, chemical, and pharmaceutical industries; surface analysis; and the structural identification of unknowns.

Certain exemplary embodiments comprise a mass spectrometer that can use the Fourier transform ion cyclotron resonance (FTICR) technique (also referred to herein as "Fourier transform mass spectrometry" or "FTMS") to determine the molecular mass of ions.

When a gas phase ion at low pressure is subjected to a uniform static magnetic field, the resulting behavior of the ion can be determined by the magnitude and orientation of the ion velocity with respect to the magnetic field. If the ion is at rest, or if the ion has only a velocity parallel to the applied field, the ion experiences no interaction with the field.

If there is a component of the ion velocity that is perpendicular to the applied field, the ion will experience a force that is perpendicular to both the velocity component and the applied field. This force results in a circular ion trajectory that is referred to as ion cyclotron motion. In the absence of any other forces on the ion, the angular frequency of this motion is a simple function of the ion charge, the ion mass, and the magnetic field strength, as shown in the following Equation 1:

$$\text{omega}=qB/m$$

where: omega=angular frequency (radians/second)

q=ion charge (coulombs)

B=magnetic field strength (tesla)

m=ion mass (kilograms)

An FTMS can exploit the fundamental relationship described in Equation 1 to determine the mass of ions by inducing large amplitude cyclotron motion and then determining the frequency of the motion.

The ions to be analyzed can first be introduced to the magnetic field with minimal perpendicular (radial) velocity and dispersion. The cyclotron motion induced by the magnetic field can effect radial confinement of the ions; however, ion movement parallel to the axis of the field is typically constrained by a pair of "trapping" electrodes. These electrodes typically consist of a pair of parallel-plates oriented perpendicular to the magnetic axis and disposed on opposite ends of the axial dimension of initial ion population. These trapping electrodes can be maintained at a potential that is of the same sign as the charge of the ions and of sufficient magnitude to effect axial confinement of the ions between the electrode pair.

The trapped ions then can be exposed to an electric field that is perpendicular to the magnetic field and oscillates at the cyclotron frequency of the ions to be analyzed. Such a field is typically created by applying appropriate differential potentials to a second pair of parallel-plate "excite" electrodes oriented parallel to the magnetic axis and disposed on opposing sides of the radial dimension of the initial ion population.

If ions of more than one molecular mass are to be analyzed, the frequency of the oscillating field can be swept over an appropriate frequency range, or be comprised of an appropriate mix of individual frequency components. When the frequency of the oscillating field matches the cyclotron frequency for a given ion mass, all of the ions of that mass will experience resonant acceleration by the electric field and the radius of their cyclotron motion will increase.

During this resonant acceleration, the initial radial dispersion of the ions is essentially unchanged. The excited ions will tend to remain grouped together on the circumference of the new cyclotron orbit, and to the extent that the dispersion is small relative to the new cyclotron radius, their motion will tend to be mutually in phase or coherent. If the initial ion population consisted of ions of more than one molecular mass, the acceleration process can result in a multiple isomass ion bundles, each orbiting at its respective cyclotron frequency.

The acceleration can be continued until the radius of the cyclotron orbit brings the ions near enough to one or more detection electrodes to result in a detectable image charge being induced on the electrodes. Typically these "detect" electrodes will consist of a third pair of parallel-plate electrodes disposed on opposing sides of the radial dimension of the initial ion population and oriented perpendicular to both the excite and trap electrodes. Thus the three pairs of parallel-plate electrodes employed for ion trapping, excitation, and detection can be mutually perpendicular and together can form a closed box-like structure referred to as a trapped ion cell. Other cell designs are possible, including, for example, cylindrical cells.

FIG. 1 is simplified diagram of an exemplary embodiment of a trapped ion cell 1000, comprising excite electrodes 1010, trap electrodes 1020, and detect electrodes 1030.

As the coherent cyclotron motion within the cell causes each isomass bundle of ions to alternately approach and recede from a detection electrode 1030, the image charge on the detection electrode can correspondingly increase and decrease. If the detection electrodes 1030 are made part of an external amplifier circuit (not shown), the alternating image charge will result in a sinusoidal current flow in the external circuit. The amplitude of the current is proportional to the total charge of the orbiting ion bundle and is thus indicative of the number of ions present. This current can be amplified and digitized, and the frequency data can be extracted by means of a time to frequency transform, such as the Fourier transform, which can be provided by computer employing a Fast Fourier transform algorithm or the like. Finally, the resulting frequency spectrum can be converted to a mass spectrum using the relationship in Equation 1.

As used herein, the term "ion" means an atom or a group of atoms that has acquired a net electric charge by gaining or losing one or more electrons or gaining or losing one or more protons. An ion can be formed in numerous manners, including by breaking up a molecule of a gas under the action of an electric current, of ultraviolet and certain other rays, and/or of high temperatures.

As used herein, the term "species" means the compositional identity of a substance, such as an ion, molecule, or atom. For example, of 1000 molecules in a typical air sample, we might expect the molecular species of about 781 of those molecules to be nitrogen or N2, the molecular species of about 209 of those molecules to be oxygen or O2, and/or the molecular species of about 9 of those molecules to be argon or Ar.

As used herein, the term "ionic component" means an ionic species.

As used herein, the terms "composite" means a combination of measurements. For example, if a length of one board is 2 feet, and the length of another is 3 feet, then the composite length of the two boards when laid end-to-end is 5 feet, assuming that each board's length has a weighting factor of 1. A composite need not be a linear combination.

As used herein, the term "mass spectrum" means a plot having molecular mass or a function thereof (e.g., mass-to-charge ratio (m/z), ion mass, etc.) as the independent variable. The dependent variable is typically a quantitative measure, such as abundance, relative abundance, intensity, concentration, number of ions, number of molecules, number of atoms, counts/millivolt, counts, etc. For example, in the context of ions, a mass spectrum typically presents mass-to-charge ratio (m/z) as the independent variable, where m is the mass of the ion species and z is the charge of the ion species, and the dependent variable is most commonly an abundance of each molecular ion and/or its fragment ions.

As used herein, unless described otherwise, the term "quantity" means any quantitative measure. For example, the quantity of an ion of a particular species can be its abundance, relative abundance, intensity, concentration, and/or count, etc.

As used herein, the term "relative abundance", in the context of ions, means the number of times an ion of a particular m/z ratio is detected. For example, assignment of relative abundance can be obtained by assigning the most abundant ion species a relative abundance of 100%. All other ion species can be shown as a percentage of that most abundant ion species.

As used herein, the term "predominant ionic component" means a most abundant ion species of all ionic species under consideration.

As used herein, the term "eject" means to make ions of a particular ion species undetectable. For example ejection can occur via physically removing all ions of a currently and apparently predominant ion species from the detection region of the FTMS cell at a rate sufficient to prevent detection. This can be useful so that ions of less abundant species can be more easily detected.

A mass spectrum can be used to identify the ion species present in a sample. For example, a mass spectrum might reveal that a sample contains nitrogen, oxygen, carbon dioxide, and argon ions. Moreover, a sufficiently reproducible mass spectrum can be used to quantify the relative numbers of ions of each ion species present in the sample.

Knowledge of a sample's ion species and their quantities can be very useful for sample analysis, process monitoring, and/or process control. Additional applications can include pharmaceutical quality control; precision process monitoring in the flavors and fragrances industry; flavor and smell chemistry; biochemistry; protein, peptide, and DNA analyses; biopolymer sequencing; protein mass fingerprinting; studies of inherited metabolic diseases; viral identification; drug metabolism; analysis of respiratory gases; combinatorial chemistry; environmental studies; water analysis; soil remediation studies; geochemistry; geochronology; fossil studies; petroleum exploration; petrochemical production; atmospheric chemistry; space exploration; the monitoring of public spaces for the introduction of noxious chemical and/or biological agents; explosives and/or contraband detection; and/or forensics, etc.

Figure 2:
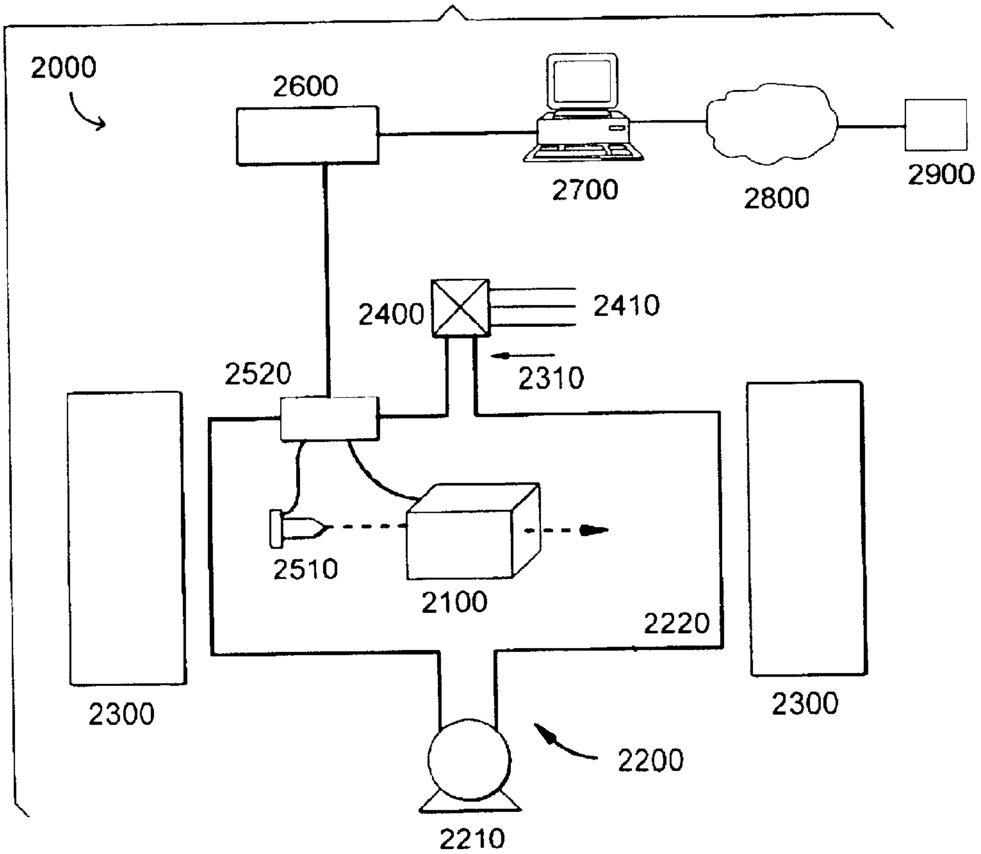
FIG. 2 is a block diagram of an exemplary embodiment of a general FTMS system.

FIG. 2 is a block diagram of an exemplary embodiment of a general implementation of an FTMS system 2000, which can comprise various subsystems to perform certain methods and/or processes described herein, such as the analytical sequence described above. A trapped ion cell 2100, such as the trapped ion cell 1000 of FIG. 1, can be contained within a vacuum system 2200 comprised of a chamber 2220 which can be evacuated by an appropriate pumping device 2210. The chamber can be situated within a magnet structure 2300 that can impose a homogeneous static magnetic field over the dimension of the trapped ion cell 2100. While magnet structure 2300 is shown in FIG. 2 as a permanent magnet, such as a 1 Tesla SmCO5 utility-free magnet, a superconducting magnet may also be used to provide the magnetic field.

Pumping device 2210 can be an ion pump that is an integral part of the vacuum chamber 2220. Such an ion pump can use the same magnetic field from magnet structure 2300 as is used by the trapped ion cell 2100, can operate at about 6.5 kV, and/or can automatically provide and/or maintain a vacuum in vacuum chamber 2220 of as low as about $10^{-10}$ Torr. Vacuum chamber 2220 can be automatically maintained at about 60 C. and/or can be heated to a user-selectable temperature up to about 220 C.

The sample to be analyzed can be admitted to the vacuum chamber 2220 by a gas phase sample introduction system 2400 that can, for example, consist of a gas chromatograph column and/or a leak valve, such as a pulsed mass spectrometer leak valve with controlled energy closure and/or a pulsed sampling valve, etc. If a valve is used, inlet conditions can include a pressure of between about 20 torr and about 30 psia; a user-selectable temperature between about 25 C. and about 160 C.; filtration down to about 1 micron; and/or a flowrate between about 0.5 ml/min to about 200 ml/min.

The sample introduction system 2400 can have the ability to automatically select from among multiple potential sample sources 2410, and can introduce a sample having a user-adjustable or automatically-adjustable volume of from about a 2 picoliters to about a 200 picoliters. Because the amounts of gas introduced via the valve during the valve pulses can be substantially Gaussian-distributed with a standard deviation of about 10% or less, each sample can have a substantially similar number of molecules. The sampled molecules can be automatically converted to charged ions within the trapped ion cell 2100 by a means for ionizing 2520, such as a gated electron beam passing through the cell 2100, a photon source, chemical ionizer, negative ionizer, electron ionization, electrospray ionization (ESI), matrix assisted laser desorption/ionization (MALDI), atmospheric pressure chemical ionization (APCI), fast atom bombardment (FAB), and/or inductively coupled plasma (ICP). Alternatively, the sample molecules can be created external to the vacuum chamber 2220 by any one of many different techniques, including any means for ionizing, and then injected along the magnetic field axis into the chamber 2220 and trapped ion cell 2100. Prior to injection, ions can encounter an ion guide, such as a quadrupole ion guide and/or an RF quadrupole ion guide.

Once inside the ion cell 2100, the resulting cyclotron motion can be automatically measured for each packet of "exact" mass ions via a time domain measurement. The measured ions can serve as a surrogate for the molecules in the sample. Any of various transforms, such as a Fourier transform, can be automatically applied to convert the measurement data from the time domain to the frequency domain. Because frequency is related to mass by a known non-linear inverse proportional relationship, a very accurate mass value can be automatically determined.

Various electronic circuits can be used to automatically monitor, log, and/or control any of the operations or functions of the FTMS system, such as those described above, and can be contained within an electronics package 2600 which can be controlled by, and/or implemented on, an information device 2700, such as a computer based data system, such as a Windows NT/2000 platform. Information device 2700 also can be employed to automatically perform reduction, manipulation, display, and/or communication of the acquired signal data, such as the various described transforms. Via a network 2800 (e.g., a public, private, circuit-switched, packet-switched, virtual, radio, telephone, cellular, cable, DSL, satellite, microwave, AC power, ethernet, ModBus, OPC, LAN, WAN, Internet, intranet, wireless, Wi-Fi, BlueTooth, Airport, 802.11a, 802.11b, 802.11g, etc., network), one or more remote information devices 2900 can securely monitor, control, and/or communicate with information device 2700 and/or electronics package 2600.

Certain exemplary embodiments of FTMS system 2000 can automatically log data to a database, spreadsheet file, printer, analog output device, etc. Certain exemplary embodiments of FTMS system 2000 can automatically provide an alarm and/or notification if a particular event occurs, such as the detection of a particular ion, a change of a concentration and/or intensity of component above or below a predetermined level, a failed analysis, etc.

Certain exemplary embodiments of FTMS system 2000 can interface with a wide variety of inlets, direct insertion probes, membrane introduction mass spectrometry (MIMS) probes, and/or evolved gas analysis (EGA) devices, such as the thermo-gravimetric and/or trap & purge units.

Certain exemplary embodiments of FTMS system 2000 can automatically switch from a first sample stream to a second sample stream and introduce a sample from the second sample stream while still analyzing a sample from the first sample stream. Thus, up to about 64 sample streams can be multiplexed and/or controlled. This can potentially substantially improve overall measurement speed, particularly if purging of the first sample stream is a relatively long process.

Certain exemplary embodiments of FTMS system 2000 can automatically provide a complete analysis based on an extremely small amount of sample. For example, certain exemplary embodiments of FTMS system 2000 can automatically measure a mass range of from about 2 to about 1000 m/z, including all values therebetween, such as for example about 6.0001, 12.47, 54.94312, 914.356, etc., and including all subranges therebetween, such as for example from about 2 to about 12, from about 6 to about 497, etc.

Certain exemplary embodiments of FTMS system 2000 can automatically provide a mass determination to at least 3 significant figures to the right of the decimal point or down to at least about $1/1000^{th}$ of an m/z.

Certain exemplary embodiments of FTMS system 2000 can automatically provide a mass measurement resolution of from about 1 to about 20,000, including all values and subranges therebetween, when measured at about 100 m/z to about 120 m/z, including all values and subranges therebetween.

Certain exemplary embodiments of FTMS system 2000 can automatically provide a concentration measurement from 100 percent down to about 0.1 to about 1 ppm, including all values therebetween such as about 0.2, 0.51, 0.8, 1, 2.2, 5, 10, 25.6 ppm, etc., including all subranges therebetween, such as from about 1 to about 10 ppm, from about 100 ppm to about 1 percent, from about 1 percent to about 100 percent, etc.

Certain exemplary embodiments of FTMS system 2000 can automatically provide a mass accuracy from about ±0.0002 m/z to about ±0.001 m/z, including all values and subranges therebetween, when measured at about 28 m/z.

Certain exemplary embodiments of FTMS system 2000 can automatically provide a mass repeatability from about 0.001 m/z (about 35 ppm) to about 0.0025 m/z (about 90 ppm), including all values and subranges therebetween, when measured at about 28 m/z.

Certain exemplary embodiments of FTMS system 2000 can automatically provide a linearity of from about 1 to about 3 orders of magnitude, including all values and subranges therebetween.

Figure 3:
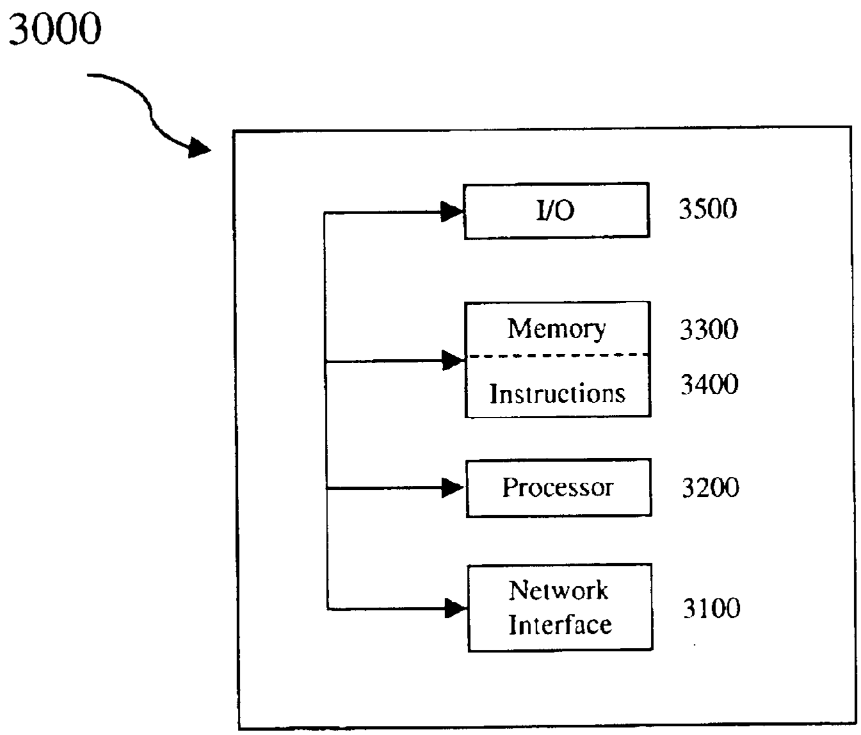
FIG. 3 is a block diagram of an exemplary embodiment of an information device.

FIG. 3 is a block diagram of an exemplary embodiment of an information device 3000, which can represent any information device 2700, 2900 of FIG. 2. Information device 3000 can include well-known components such as one or more network interfaces 3100, one or more processors 3200, one or more memories 3300 containing instructions 3400, and/or one or more input/output (I/O) devices 3500, etc.

As used herein, the term "information device" means any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, one or more user interfaces, etc.

As used herein, the term "network interface" means any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

As used herein, the term "processor" means a device for processing machine-readable instruction. A processor can be a central processing unit, a local processor, a remote processor, parallel processors, and/or distributed processors, etc. The processor can be a general-purpose microprocessor, such the Pentium III series of microprocessors manufactured by the Intel Corporation of Santa Clara, Calif. In another embodiment, the processor can be an Application Specific Integrated Circuit (ASIC) or a Field Programmable Gate Array (FPGA) that has been designed to implement in its hardware and/or firmware at least a part of an embodiment disclosed herein.

As used herein, a "memory device" means any hardware element capable of data storage. Memory devices can comprise non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc.

As used herein, the term "firmware" means machine-readable instructions that are stored in a read-only memory (ROM). ROM's can comprise PROMs and EPROMs.

As used herein, the term "I/O device" means any device capable of providing input to, and/or output from, an information device. An I/O device can be any sensory-oriented input and/or output device, such as an audio, visual, tactile (including temperature, pressure, pain, texture, etc.), olfactory, and/or taste-oriented device, including, for example, a monitor, display, keyboard, keypad, touchpad, pointing device, microphone, speaker, video camera, camera, scanner, and/or printer, potentially including a port to which an I/O device can be attached or connected.

As used herein, the term "user interface" means any device for rendering information to a user and/or requesting information from the user. A graphical user interface can include one or more elements such as, for example, a window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, image, icon, button, control, dial, slider, scroll bar, cursor, status bar, stepper, and/or progress indicator, etc. An audio user interface can include a volume control, pitch control, speed control, voice selector, etc.

In certain exemplary embodiments, a user interface of an information device 3000 of FTMS system 2000 (shown in FIG. 2) can provide one or more elements for parameter adjustment, parameter observation, and/or access and/or comparison of mass spectra. In certain exemplary embodiments, a user interface can provide a live operational status window of important analytical and/or operational parameters; simultaneous display of current and/or previous mass spectra, potentially in addition to the original time-domain measurements; side-by-side comparison of two-component trend plots; control of process instrumentation operation on-the-fly; and/or control of multiple FTMS systems.

Figure 4:
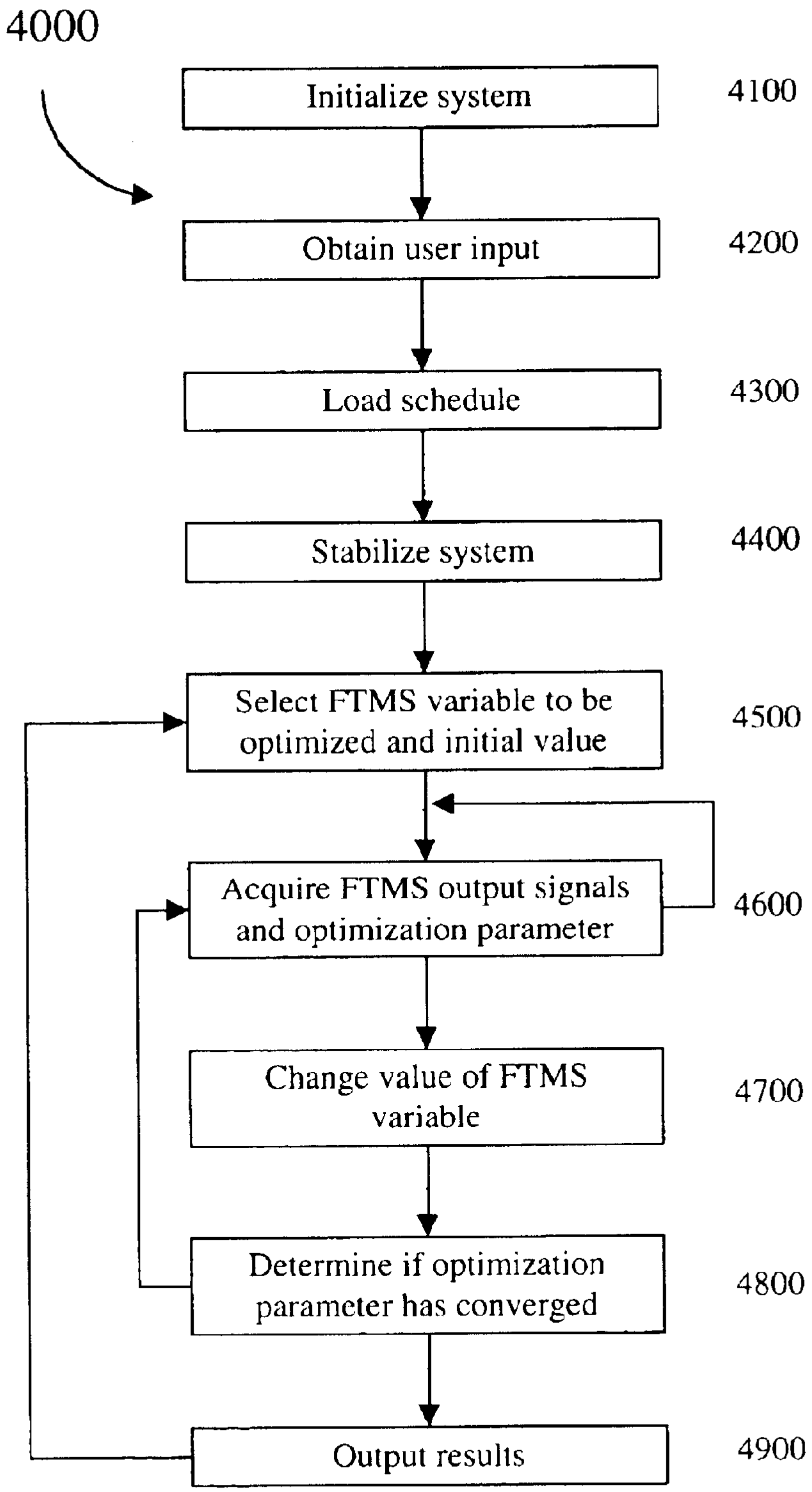
FIG. 4 is a flow chart of an exemplary embodiment of a method for optimizing an FTMS variable.

FIG. 4 is a flow chart of an exemplary embodiment 4000 of a method for automatically substantially optimizing one or more FTMS variables, such as for example, ionizing current flux or beam current density which, along with the gas pulse, can determine the number of ions present in the cell of the FTMS); ionizing stage trapping plate voltage; detection stage trapping plate voltage; and/or ion location in the FTMS cell, etc.

Prior to optimization, several preliminary activities can occur. For example at activity 4100 of method 4000, an automated FTMS optimization system can initialize its variables, such as any operational or programming variables.

At activity 4200, the system can request and/or receive user input regarding a sample valve setting (e.g. voltage) that causes a substantially fixed amount (e.g., number of molecules) of gas to be introduced into the FTMS cell, and a chosen starting ionizing current flux. These two parameters—valve voltage and flux—together can determine the initial number of charges formed inside the cell. At activity 4300, the system can create and load a timed series of operational events (according to an event table or schedule) that include a data acquisition scan.

At activity 4400, the system can perform a sufficient number of data acquisitions to allow the system to stabilize, that is, reach a stable operating state. The acquired data include a current signal having a measured amplitude and time, which can be converted via Fourier transform to a dataset of amplitude and frequency, and which can be additionally converted, typically via applying a linear correction curve, to a dataset of amplitude and a mass function (e.g., molecular mass, mass-to-charge ratio (m/z), etc.). Each ion species present in the sample will generate a characteristic frequency that depends on the molecular mass of the ion species and the magnetic field applied to the cell and an amplitude that depends on the quantity of that particular ion species present in the cell. Thus, when amplitude is plotted versus frequency, multiple amplitude peaks will occur, each representative of a particular ion species. The values of these amplitude peaks, or mass-corrected amplitude peaks, can be mathematically combined, such as via summing, to arrive at a composite amplitude. Note that the composite amplitude can be formed by applying a weighting factor to one or more of the frequency-domain amplitudes or the mass-corrected amplitudes of the constituent ion species. Thus, if a weighting factor of one is applied to the amplitudes of the three most predominant ion species, and a weighting factor of zero is applied to the amplitudes of the remaining ion species, the composite amplitude will represent the summed amplitudes of the three most predominant species.

At activity 4500, the system can select which FTMS variable to substantially optimize, based upon for example, user input, an optimization iteration loop count, and/or a preprogrammed parameter. The system can also select an initial value for the selected FTMS variable.

At activity 4600, the system can acquire FTMS output data, such as the amplitude, time, frequency, and/or a mass function of the output signal, and an optimization parameter, such as a composite amplitude of the output signal, or the variance in that composite amplitude. This data acquisition can repeat for a predetermined (e.g., user-chosen or system-chosen) number of iterations, each acquisition comprising a user specified number of spectra acquisitions, each data acquisition containing both amplitude and frequency or mass data.

At activity 4700, the system can change the value of the FTMS variable.

Activities 4600 and 4700 can repeat until, at activity 4800, the system can determine that the optimization parameter has substantially converged as a result of the most recent change in the value of the FTMS variable, thereby indicating that a substantially optimal value has been found for the FTMS variable.

At activity 4900, results such as the FTMS variable, its values, the optimization parameter, and/or its values, etc., can be output to for example, a file, memory device, I/O device, control system, and/or user interface, etc. The output results can be available for other methods. Then, the system can repeat activities 4500 through 4900 until all FTMS variables have been optimized.

Numerous FTMS variables can be optimized. For example, ionizing current flux can be substantially optimized by substantially maximizing the value of the ionizing current flux within the range that changes to the ionizing current flux are substantially linear, that is, by finding a maximum linearly-responsive ionizing current flux. Thus, in effect, the linearly-responsive ionizing current flux is the FTMS variable to be optimized.

For example, the composite amplitudes can be compared after doubling the ion current flux and before doubling to determine if the FTMS cell is responding substantially non-linearly, which means the cell has too many ions present, and which can be indicated by a change in total signal current or composite amplitude of a factor of less than about 1.8 to about 1.999, including all values therebetween, such as for example, about 1.832, 1.85, 1.9, 1.977, etc., and all subranges therebetween, such as for example, about 1.88 to about 1.93, etc., or greater than about 2.001 to about 2.2, including all values therebetween, such as for example, about 2.003, 2.05, 2.1, 2.177, etc., and all subranges therebetween, such as for example, about 2.07 to about 2.12, etc. In other words, non-linearity can be indicated when a change in the optimization parameter is less than about 90 percent to about 99.95 or greater than about 100.05 percent to about 110 percent, including all values and subranges therebetween, of a change in the ionization current flux.

If too many ions are present in the cell, the system can reduce the ionizing current flux by, for example, a factor of about 20 percent to about 80 percent, including all values therebetween, such as for example, about 0.25, 0.333, 0.4481, 0.5, 0.667, etc., and all subranges therebetween, such as for example, about 0.42 to about 0.60, etc. and then continue the experiment. If not, the system can increase the ionizing current by, for example, a factor of about 1.2 to about 3, including all values therebetween, such as for example, about 1.55, 2, 2.4973, etc., and all subranges therebetween, such as for example, about 1.92 to about 2.1, etc., and then check the linearity again. This pattern can be repeated as necessary until the optimization parameter substantially converges (e.g., reaches a maximum value at which substantial linearity is maintained), thereby indicating that a substantially optimal ionizing current flux value has been found.

The system can attempt to optimize the voltage on the trapping plates during the ionizing stage of the experiment. To do this, in certain exemplary embodiments, the system can perform several sub-activities. For example, the system can decrease the voltage from a user-chosen starting value and collect multiple composite amplitudes. Also, the system can compare the optimization parameter, such as the variance, between the composite amplitude associated with the previous voltage value and the composite amplitude associated with the current voltage value. Moreover, the system can decide whether the optimization parameter considered over the number of spectra measured, is diverging or converging (e.g., is increasing or decreasing) and take appropriate action to continue adjusting the voltage until a substantially optimum value for the voltage is found, based on convergence of the optimization parameter (e.g., a minimal variance).

The system can apply a similar algorithm to the trapping voltages present during the detection stage of the experiment to substantially converge the optimization parameter (e.g., minimize the totaled average composite spectral amplitude variance) and thereby determine a substantially optimum value for this voltage.

The system can substantially optimize the location of the ions relative to the fixed detection plates prior to detection in the cell, by substantially converging the optimization parameter (e.g., substantially maximizing the intensity (composite amplitude) of the total signal current.

Note that the substantial optimization of other FTMS variables is possible and contemplated, such as for example, the time delay between sample introduction and detection, the size of gas pulse introduced into the FTMS by the sampling valve, the wait time between individual acquisitions, and/or any function of a measured FTMS variable. Moreover, an optimal sequence to optimizing any chosen group of FTMS variables can be determined and utilized.

Moreover, although the optimization parameters described herein have involved either composite amplitude itself or variance in composite amplitude, other statistically-oriented optimization parameters, which can be a function of composite amplitude, are possible and contemplated. For example, at least the following optimization parameters are possible: composite of the average amplitude of the 3 most abundant species, variance of a predominant species amplitude, average composite amplitude, mode of composite amplitude, mode of variance of composite amplitude, variance of maximum composite amplitude, variance of minimum composite amplitude, variance of a time-weighted composite amplitude, second central moment, a bias-corrected variance, covariance, correlation, root mean square, mean deviation, sample variance, variance distribution, standard deviation, standard deviation of maximum composite amplitude, standard deviation of minimum composite amplitude, standard deviation of a time-weighted composite amplitude, and/or spread, etc.

Thus, the value of an FTMS variable can be substantially optimized by substantially converging on a convergence target, such as a value and/or range (e.g., substantially converging on a local or absolute minima, maxima, asymptote, and/or inflection point, etc.; etc.) associated with an optimization parameter thereof via repeated changing of the value of the FTMS variable to be optimized. The convergence target can be predetermined or found on-the-fly.

For example, optimization can be deemed to occur when, upon changing an FTMS variable, a variance in composite amplitude decreases to within about 2 percent or some other predetermined range. As another example, optimization of an FTMS variable can be deemed to occur when, upon repeatedly changing values of the FTMS variable, the resulting composite amplitude is substantially maximized at a particular, on-the-fly-determined value of the FTMS variable. As yet another example, optimization of an FTMS variable can be deemed to occur when, upon repeatedly changing values of the FTMS variable, an average of the resulting composite amplitudes is substantially minimized.

Figure 5:
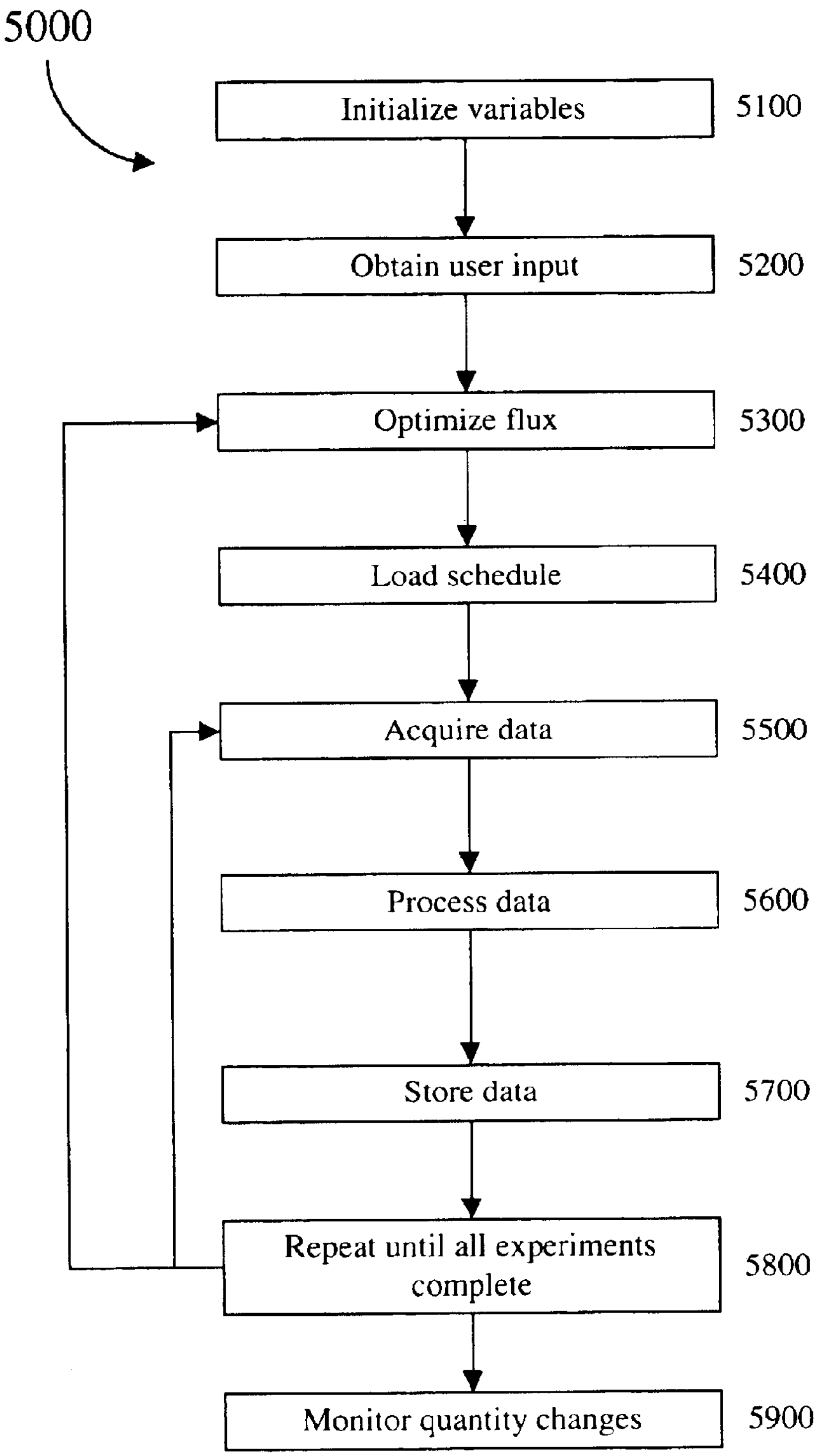
FIG. 5 is a flow chart of an exemplary embodiment of a method for analyzing a sample using an FTMS.

FIG. 5 is a flow chart of an exemplary embodiment 5000 of a method for automatically analyzing a sample using an FTMS. Via method 5000, an FTMS system can automatically exchange the dynamic range in a quantitative FTMS experiment. That is, the FTMS system can extend the 3 order of magnitude dynamic range of a non-optimized FTMS system to cover a wider range (e.g., from 100% to PPM (6 orders of magnitude)) by dividing up that range into multiple experiments (e.g., 3 experiments) which each cover predetermined orders of magnitude (e.g. 2 orders of magnitude).

For example, Experiment 1 can address components (i.e., ion species) that are present from approximately 1% to approximately 100%, Experiment 2 can address components that are present from approximately 100 PPM to approximately 10000 PPM, and Experiment 3 can address components that are present from approximately 1 PPM to approximately 100 PPM.

After each experiment is designed and substantially optimized individually (such as via the above-described automated FTMS optimization process of method 4000), the results can be transferred to an automated FTMS analysis process of method 5000, and a combined analysis method can be created. Running method 5000 can produce a complete quantitative analysis over the range the system is capable of analyzing with little or no operator intervention.

To implement method 5000, prior to analysis, several preliminary activities can occur. For example at activity 5100 of method 5000, an automated FTMS analysis system can initialize its variables, such as any operational or programming variables. At activity 5200, the system can obtain from the user a number of analysis cycles and number of spectra to collect for each cycle.

At activity 5300, using an automated FTMS optimization process, such as that of method 4000, the system can substantially optimize any number of FTMS variables, such as the ionizing current flux, set the FTMS variables to their optimal values, and/or determine a corresponding valve voltage and set the valve to that voltage value.

At activity 5400, the system can create and load a list of timed operational events (e.g., at least one event table or schedule) that comprises a data acquisition scan, the list including any appropriate analysis parameters, FTMS variables, factors for determining composite amplitudes, optimization parameters, convergence values and/or ranges, components, calibrations, lock masses, etc.

At activity 5500, the system can acquire data for an experiment by collecting the user-chosen number of spectra, each consisting of the user chosen number of repeated acquisitions, each data acquisition containing time series data convertible to spectral data containing both amplitude and frequency data.

At activity 5600, the system also can process the collected datasets to obtain spectral data; identify qualitative data associated with the predominant ion species (e.g., the identity of the ionic components of the sample, identity of the sample, chemical structure of the sample, etc.); determine quantitative data associated with the predominant ion species (e.g., the fraction, concentration, abundance, relative abundance, and/or relative percentage, etc., of the ion species in the sample, etc.); and/or determine ejection voltages need to eject those predominant ion species.

In certain exemplary embodiments of an FTMS system, ejection can occur via exciting these ions sufficiently at their resonant frequency to cause them to spin into and/or beyond the cell's detection plates, thereby preventing detection. Once a predominant ion species is ejected, it will not be detected. Therefore, the cell can be loaded with substantially more ions, including more of the non-predominant ions, thereby increasing the apparent concentration and the actual detectability of those non-predominant ions.

At activity 5700, the system can output the acquired and processed data, such as to a file, memory device, I/O device, control system, and/or user interface so they can be available for other methods.

At activity 5800, the system can then perform each of the next experiments in turn until all experiments have been completed, by first performing activities 5300 and 5400, during which the ionizing current flux is set to a next level set point and the valve to a next valve voltage; setting the ejection voltages needed to eject all ion species determined to be predominant in the previous experiment(s); and then performing activities 5500 through 5700.

At activity 5900, the system can monitor for changes or non-changes in the quantity of the detected ion species by repeating the multiple experiments for a predetermined time, a predetermined number of repetitions, continuously, and/or until a predetermined change and/or quantity is detected. Prior to each repetition, the identity of the predominant ion species and their associated ejection voltages can be cleared so no carryover between repetitions occurs.

Figure 6:
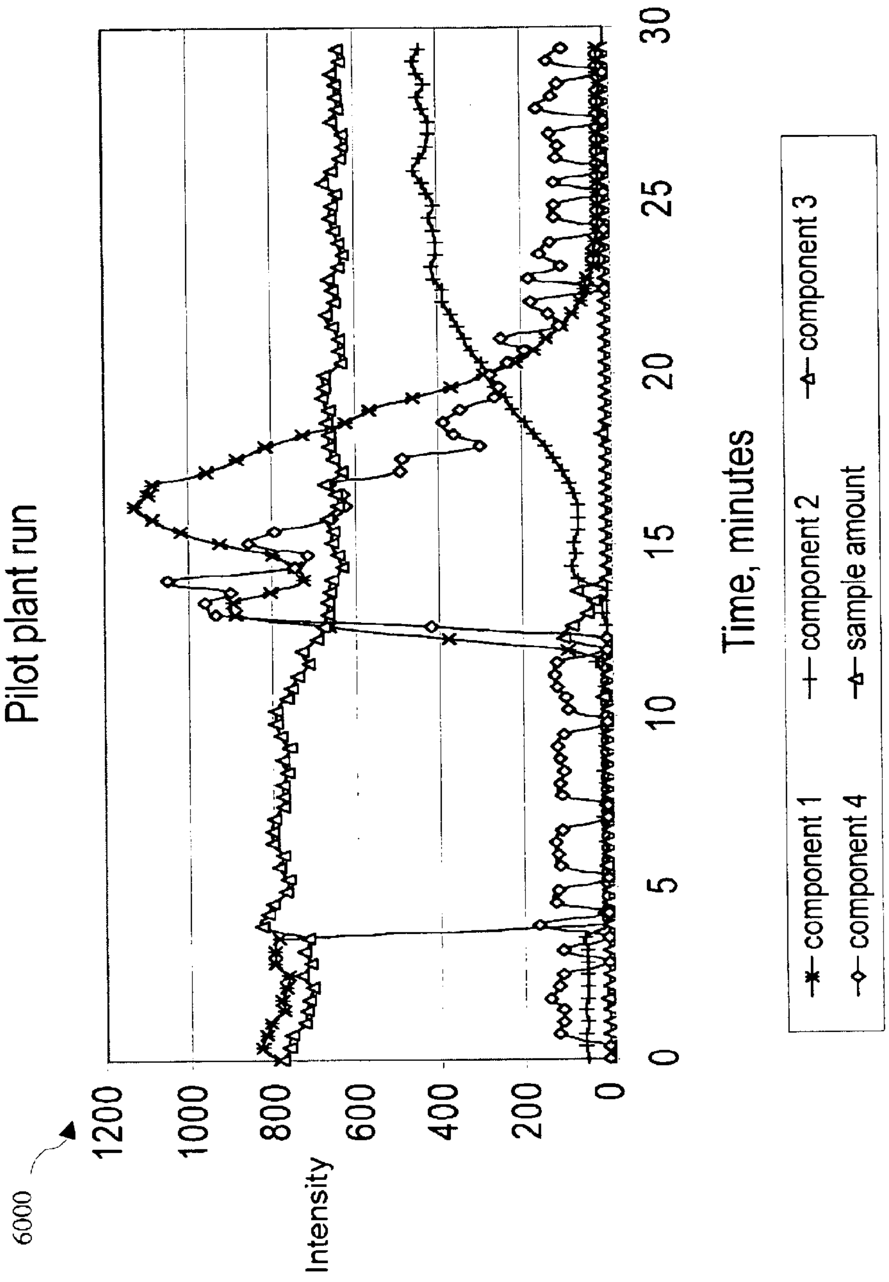
FIG. 6 is an exemplary plot of intensity versus time.

FIG. 6 is an exemplary plot 6000 of intensity versus time. Plot 6000 illustrates actual real time data generated by an exemplary embodiment of an FTMS analysis system based on sampling from a proprietary pilot plant run undergoing development. The system detected four components to the sample, including one unexpected material being created in the pilot plant about which the owner of the pilot had no awareness until use of the FTMS analysis system.

Figure 7:
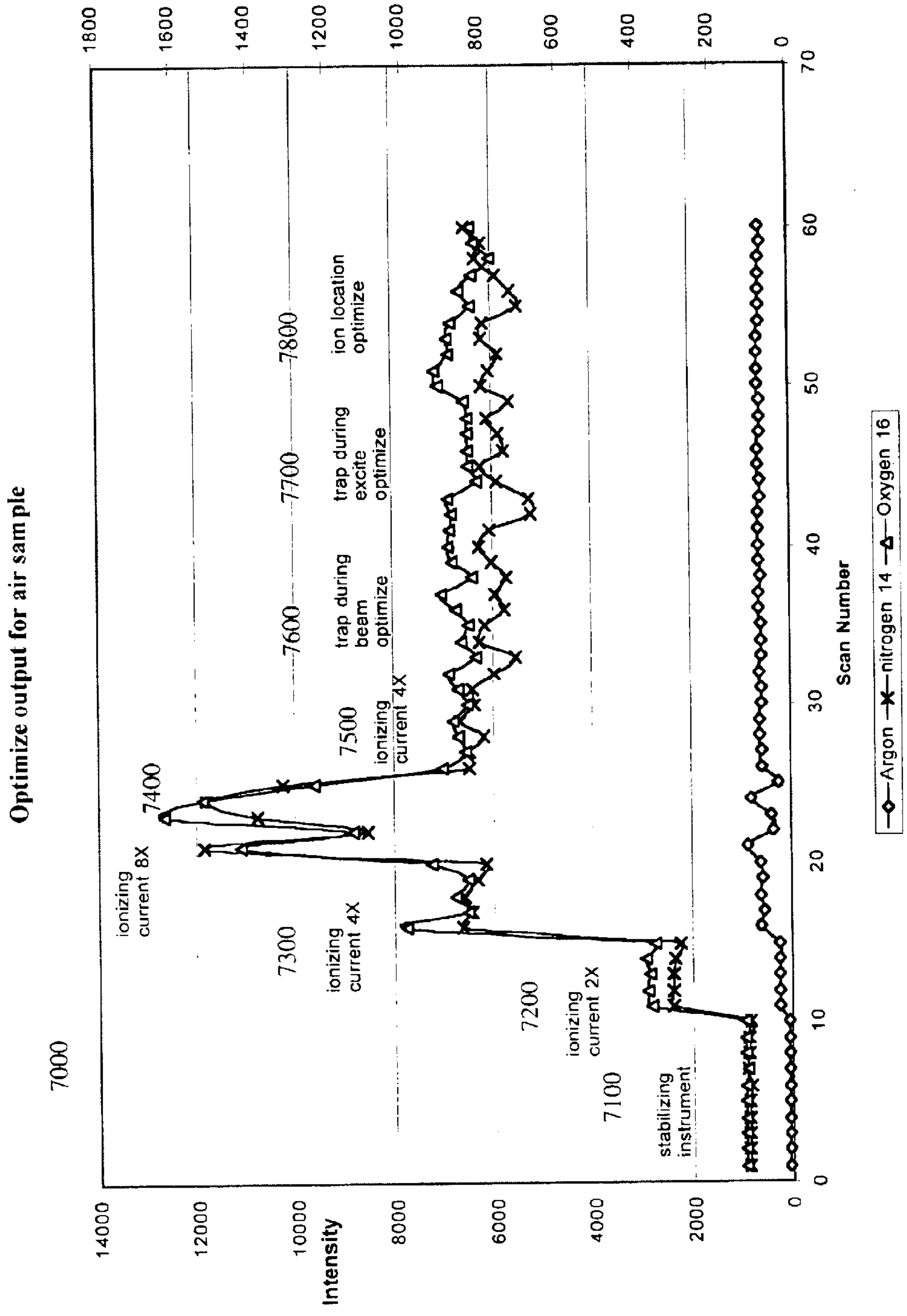
FIG. 7 is an exemplary plot of intensity versus scan number.

FIG. 7 is an exemplary plot 7000 of intensity versus scan number. Plot 7000 comprises scan periods 7100 through 7800 that graphically illustrate the actual impacts of the optimization activities of method 4000 on an FTMS sample containing air. Note that the activities of method 4000 are simultaneously completed for each of the plotted components, namely argon, nitrogen, and oxygen.

The illustrated scan periods of plot 7000 can correspond to certain embodiments of the optimization activities of method 4000 as shown in Table 1, below:

TABLE 1

Correspondence of Plot 7000 to Method 4000

| Scan Period | Activity |
|---|---|
| 7100 | 4400 |
| 7200 | 4700 after initial doubling of the ionization current flux |
| 7300 | 4700 after doubling the flux of period 7200 |
| 7400 | 4700 after doubling the flux of period 7300 |
| 7500 | 4800 after halving the flux of period 7400 |
| 7600 | 4500–4800 (for trap voltage during the ionization stage, holding the flux of period 7500) |
| 7700 | 4500–4800 (for trap voltage during the detection stage) |
| 7800 | 4500–4800 (for ion location in the cell) |

Figure 8:
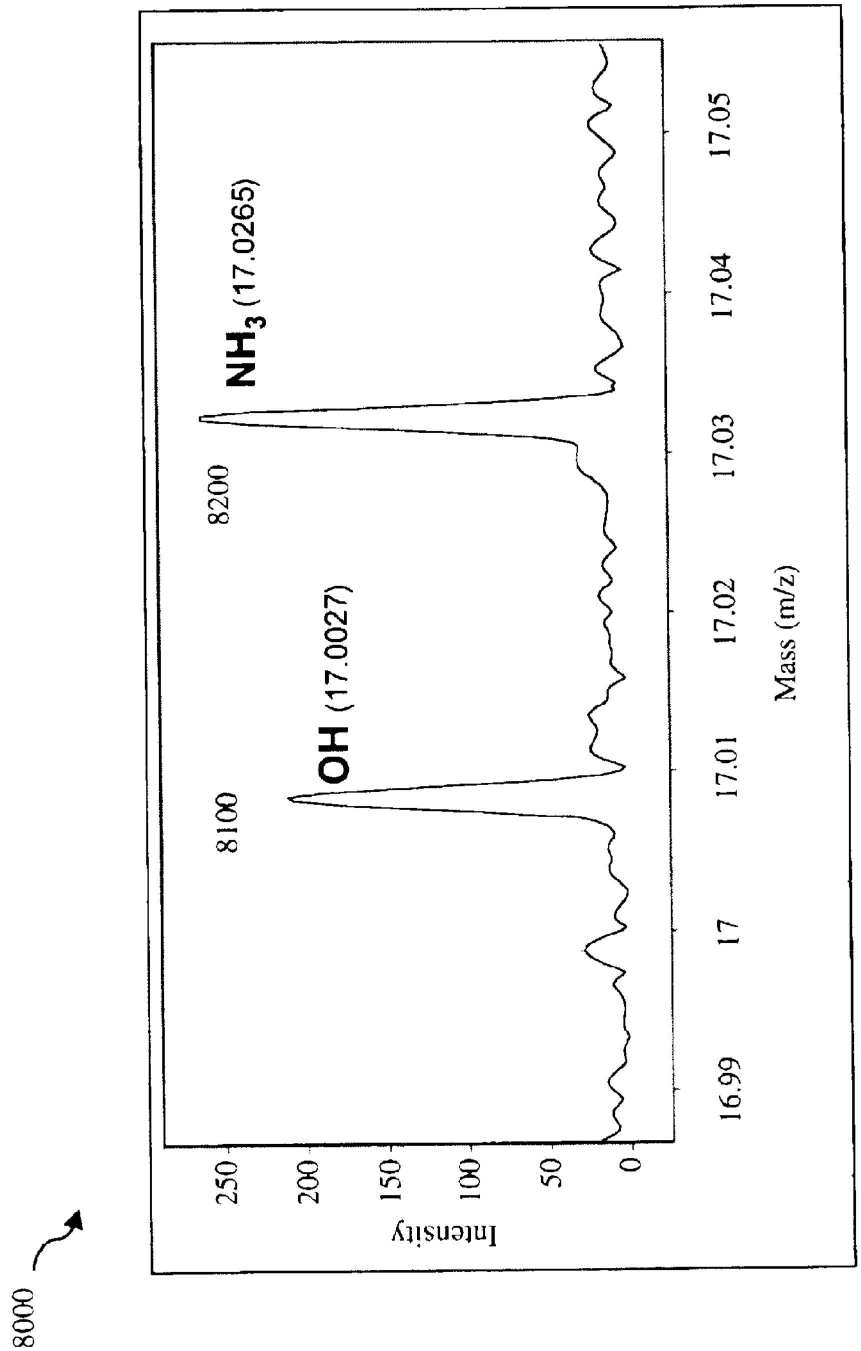
FIG. 8 is an exemplary plot of intensity versus mass-to-charge ratio.

FIG. 8 is an exemplary plot 8000 of intensity versus mass-to-charge ratio (m/z). The data shown on plot 8000 originated from an FTMS system output that was transformed from the time domain to the frequency domain, and then transformed to the mass domain. The range of masses illustrated is from about 16.99 to about 17.06 m/z. Within the illustrated range are two peaks 8100 and 8200, with peak 8100 occurring at about 17.0027 m/z, which corresponds to the mass of moisture or an hydroxyl ion (OH), and peak 8200 occurring at about 17.0265 m/z, which corresponds to the mass of an ammonia ion (NH3).

Figure 9:
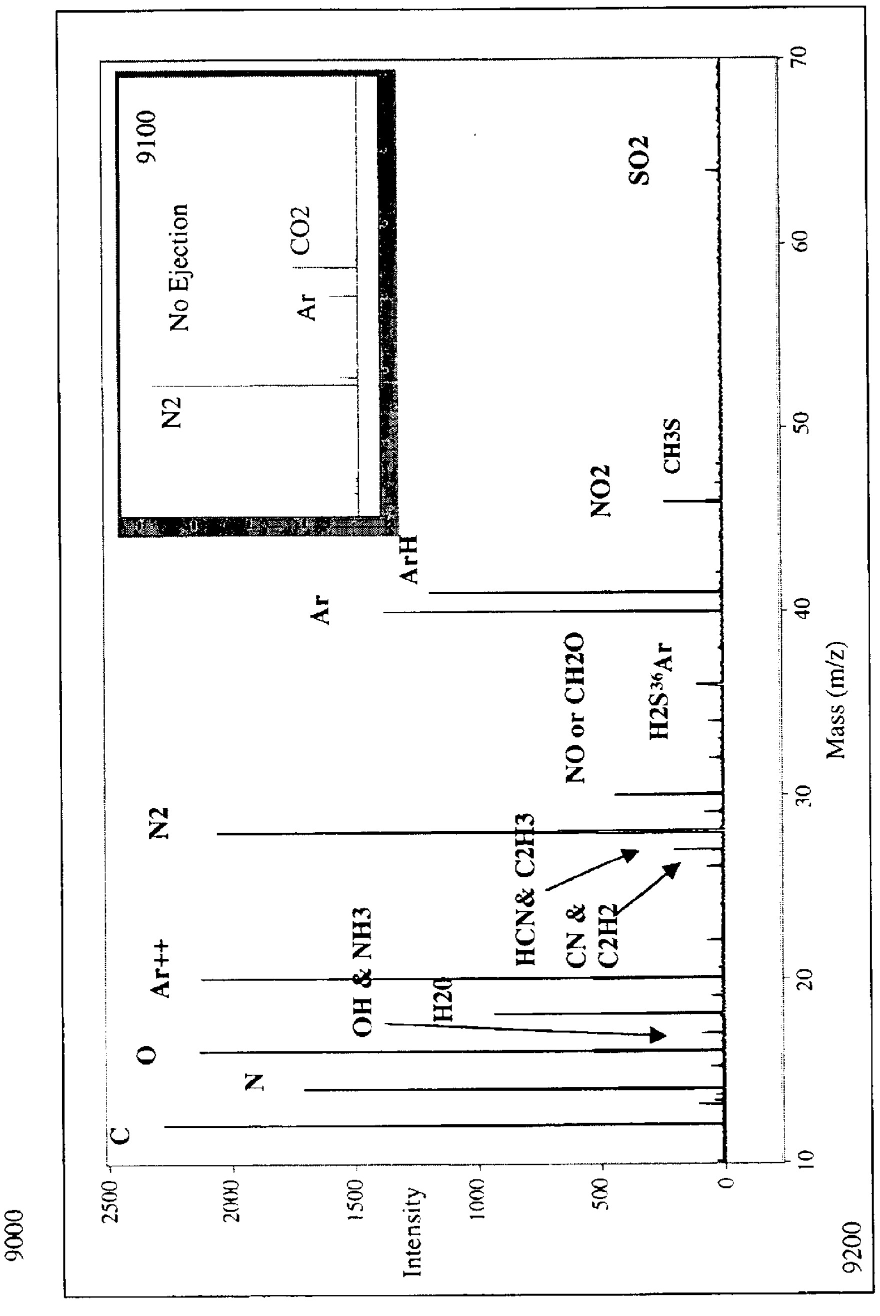
FIG. 9 is an exemplary plot of intensity versus mass-to-charge ratio.

FIG. 9 is an exemplary graphical user interface 9000 featuring several plots of intensity versus mass-to-charge ratio (m/z) for an actual sample of fermenter headspace. Plot 9100 shows an initial plot, with N2, CO2, and argon the predominant components. Plot 9200 shows a plot after the dominant components have been substantially ejected. Thus, FIG. 9 illustrates that by selectively ejecting ions during the ionization phase of the analysis, removing the intense peaks of certain predominant components and enhancing the sensitivity for weaker peaks associated with lower concentration components is possible.

An exemplary embodiment of an FTMS system and methods was utilized in an on-site, in-situ demonstration to continuously analyze and monitor off-gas generated by a biotechnology company's fermenters, which were used to generate ("cook") certain products. This specific demonstration was performed on a pilot scale fermenter with the size of less than 1000 liter (<250 Gallons). The compact, mobile, high-resolution FT-MS system used was trucked to the pilot facility and the measurement was started without mass calibrating the analyzer.

Measuring and monitoring fermentation off-gas was determined to be an effective method to determine the Respiratory Quotient (RQ) or the metabolism of the fermentation broth. Depending on the speed of fermentation and the frequency of the analysis, the demonstration showed that the embodiment could be used to improve process control, improve the process yield, and/or speed up the rate of fermentation by controlling the rate of nutrients, permitting and/or assessing the extent of the reaction, and/or verifying possible presence of undesired compounds.

For example, it was learned that although many measurements on fermenters simply look at N2, O2, CO2 and a few other simple gases, a rather wide variety of components actually evolve during fermentation and can be detected in the fermenter's headspace. It was also learned that individual components can be used as a clue to help establish the optimum operating parameters to get the best yield in any given amount of time.

Table 2 presents the detected components in a fermenter headspace, based on analyses performed at a frequency of less than one minute per analysis (1 second per co-added data point). As can be seen in the table, a large number of ion fragments are present in the spectrum ranging between mass numbers from 10 to 60. In that range are 10 doublets and even one triplet with three masses that are almost identical (isobars).

When searching for targeted compounds, such accuracy can help avoid false positives. Such accuracy can avoid the need for gas chromatograph separation.

Figure 10:
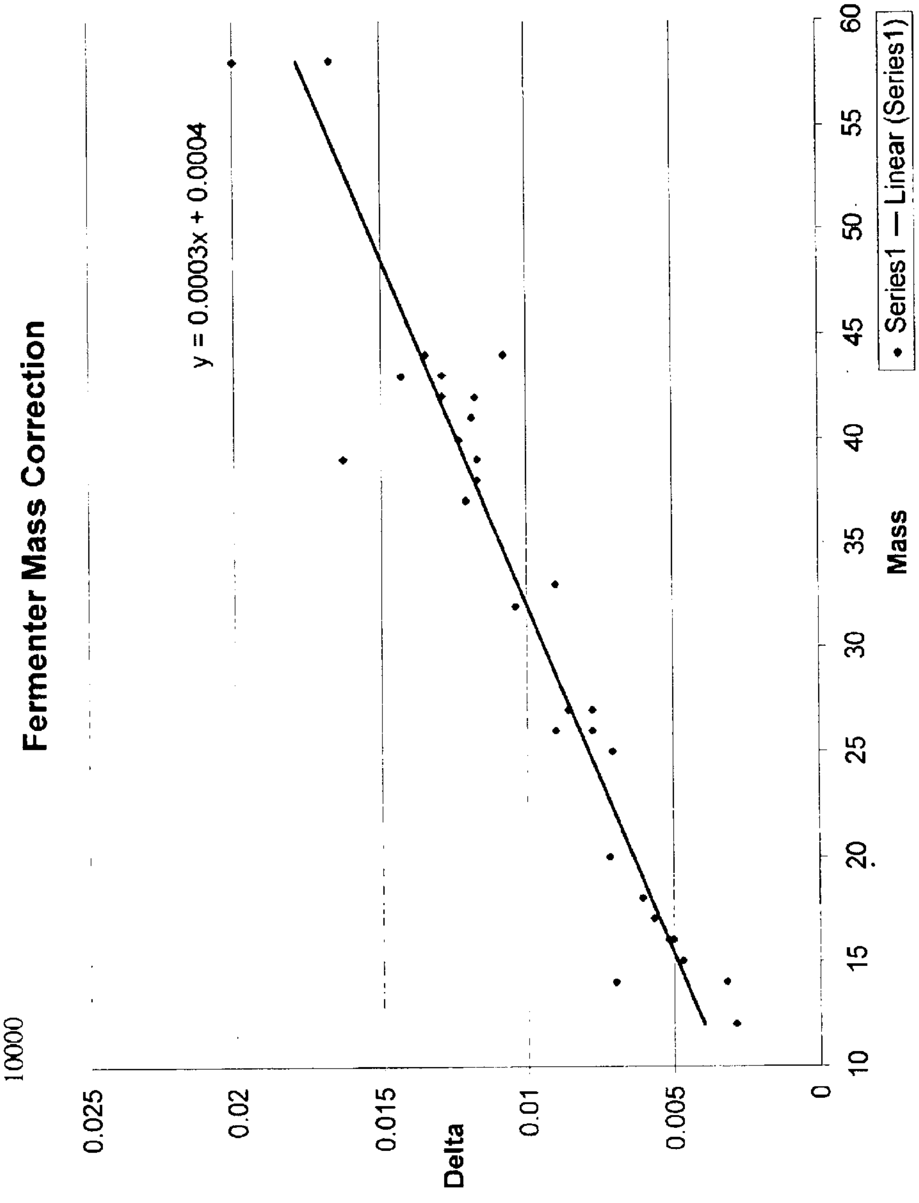
FIG. 10 is an exemplary plot of a fermenter mass correction.

Continuing with Table 2, it is worth noting there is a slight bias between the observed, measured mass and the theoretical mass. However, the bias is mathematically consistent along the mass range. Thus, when plotted, these mass biases fit nicely along a polynomial line, as shown in the exemplary plot 10000 of fermenter mass correction shown in FIG. 10.

The mass corrections made here were done after the fact. The frequency measurement for 3 or 4 of the known components were used to establish a simple linear fit for the other masses present, thereby allowing correct identification of the components.

The need for mass correction could have been circumvented with the use of a lock mass. An FTMS system can comprise the capability of utilizing even multiple lock masses to correct for variables that could affect the accuracy of the measurement. Variation in frequency and temperature are two of the corrections a dual lock mass can resolve.

Returning to the concept of resolving ion pairs, Table 3 provides experimental data showing the resolution possible with certain doublets for certain embodiments of an FTMS system.

TABLE 2

Mass Measurement (m/z) and Corrected Assignment

| Peak # | Observed Mass (m/z) | Fragment | Assignment | Theory | Corrected Mass | Corrected Delta |
|---|---|---|---|---|---|---|
| 1 | 12.0029 | C | C | 12.0000 | 11.9989 | −0.0011 |
| 2 | 14.0069 | N | N | 14.0037 | 14.0023 | −0.0014 |
| 3 | 14.0226 | CH2 | CH2 | 14.0156 | 14.0180 | 0.0024 |
| 4 | 14.7103 | noise? | noise | | 14.7055 | |
| 5 | 15.0281 | CH3 | acetone/butane/propane | 15.0234 | 15.0232 | −0.0002 |
| 6 | 15.99996 | O | H2O | 15.9949 | 15.9948 | −0.0001 |
| 7 | 16.0239 | NH2 | NH3 | 16.0187 | 16.0187 | 0.0000 |
| 8 | 16.0362 | CH4 | CH4 trace | 16.0312 | 16.0310 | −0.0002 |
| 9 | 17.0084 | OH | H2O | 17.0027 | 17.0029 | 0.0002 |
| 10 | 17.0322 | NH3 | NH3 | 17.0265 | 17.0267 | 0.0002 |
| 11 | 18.0167 | H2O | H2O | 18.0106 | 18.0109 | 0.0003 |
| 12 | 19.9884 | $Ar^{+2}$ | $Ar^{+2}$ | 19.9812 | 19.9820 | 0.0008 |
| 14 | 25.0149 | C2H | butane/propane | 25.0078 | 25.0070 | −0.0008 |
| 15 | 26.0235 | C2H2 | butane/propane | 26.0157 | 26.0153 | −0.0004 |
| 16 | 26.0121 | CN | HCN | 26.0031 | 26.0039 | 0.0008 |
| 17 | 27.0195 | HCN | HCN | 27.0109 | 27.0110 | 0.0001 |
| 18 | 27.0313 | C2H3 | butane | 27.0235 | 27.0228 | −0.0007 |
| 19 | 28.0058 | CO | CO | 27.9949 | 27.9970 | 0.0021 |
| 20 | 29.0117 | CHO | acid? | 29.0027 | 29.0026 | −0.0001 |
| 21 | 29.0224 | HN2 | HN2 | 29.0140 | 29.0133 | −0.0007 |
| 22 | 30.0067 | NO | NO | 29.9980 | 29.9973 | −0.0007 |
| 23 | 32.0002 | O2 | O2 | 31.9898 | 31.9902 | 0.0004 |
| 27 | 39.0352 | C3H3 | propane | 39.0235 | 39.0231 | −0.0004 |
| 29 | 39.9747 | Ar | Ar | 39.9624 | 39.9623 | −0.0001 |
| 32 | 41.051 | C3H5 | propane | 41.0391 | 41.0383 | −0.0008 |
| 33 | 42.0224 | C2H2O | acetone | 42.0106 | 42.0094 | −0.0012 |
| 34 | 42.0598 | C3H6 | butane | 42.0469 | 42.0468 | −0.0001 |
| 35 | 43.0327 | C2H3O | acetone | 43.0184 | 43.0194 | 0.0010 |
| 36 | 43.0677 | C3H7 | butane &? | 43.0548 | 43.0544 | −0.0004 |
| 37 | 44.0006 | CO2 | CO2 | 43.9898 | 43.9870 | −0.0028 |
| 38 | 44.0145 | N2O | N2O | 44.0010 | 44.0009 | −0.0001 |
| 39 | 45.017 | COOH | acid? | 44.9977 | 44.9978 | 0.0001 |
| 40 | 50.0291 | C4H2 | butane | 50.0157 | 50.0137 | −0.0020 |
| 42 | 58.0619 | C3H6O | acetone | 58.0419 | 58.0441 | 0.0022 |
| 43 | 58.0949 | C4H10 | butane | 58.0782 | 58.0771 | −0.0011 |

Note how close many of these doublets and triplets occur. For example, the doublet for the Nitrogen and CH2 components spans a range of less than 0.016 m/z, and the triplet for the O, NH2, and CH4 fragments spans a mass range of less than 0.0363 m/z. Knowing the identity and/or concentration of various fermenter headspace components was useful for improving process control, setting fermentation rates, reducing fermentation duration, and increasing yield.

TABLE 3

| Resolvable Ion Pairs | | | | |
|---|---|---|---|---|
| Compounds | Doublet Ions | Exact Masses (m/z) | Mass Difference | Resolution (m/Δm) |
| Ethylene | C2H4 | 28.03129 | | |
| Nitrogen | N2 | 28.00614 | 0.02515 | 1113 |
| Carbon monoxide | CO | 27.99292 | 0.01322 | 2118 |
| THF | C4H8O | 72.05751 | | |
| N-pentane | C5H12 | 72.09389 | 0.03638 | 1980 |
| Benzene | C6H6 | 78.04694 | | |
| Pyridine | C5H4N | 78.03437 | 0.01257 | 6200 |
| Water | OH | 17.00274 | | |
| Ammonia | NH3 | 17.02655 | 0.02381 | 713 |

Figure 11:
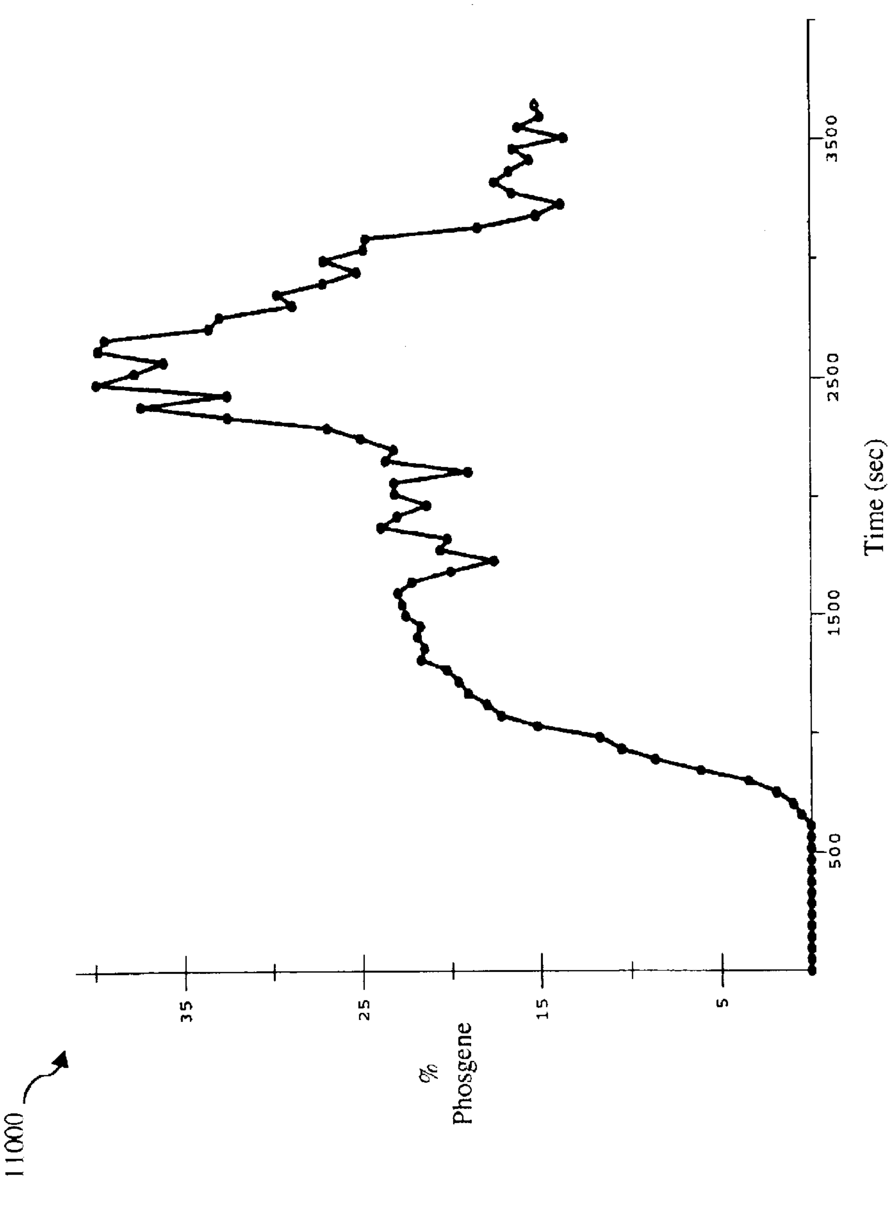
FIG. 11 is an exemplary plot of concentration versus time.

Because the identity of each ion species can be firmly and accurately established, amplitudes can be used to accurately establish the relative quantities and/or the actual quantities of ions present for each ion species. For example, FIG. 11 is an exemplary plot 11000 of concentration versus time. Plot 11000 was derived from actual data sampled by an FTMS system for a reaction that produced phosgene during the conditioning of a catalyst. The FTMS system was also used to monitor reactor shutdown to determine when all of the highly toxic phosgene was removed from the reactor. Note that certain exemplary embodiments of an FTMS system can provide plots of any quantity measure (such as abundance, relative abundance, concentration, relative concentration, percent, relative percent, ppk, ppm, ppb, weight, and/or count, etc.) versus any appropriate independent variable (such as time, molecular mass, m/z ratio, molecular species, ion species, etc.).

Certain exemplary experiments demonstrate various quantitative features of certain exemplary embodiments of an FTMS system. For example, certain exemplary embodiments of an FTMS system can generate stable quantitative information, such as from a highly reactive nitrogen trifluoride ("NF3") gas mixture. Certain exemplary embodiments can generate stable quantitative data for long periods even when using a conventional EI ionization filament. In certain exemplary embodiments, relative changes in concentration of about 5 percent can be easily detected on an instantaneous basis. Certain exemplary embodiments generate quantitative data that is linear in concentration over at least 1 order of magnitude with relative standard deviations ("RSD's") of about 1 percent to about 5 percent, including all values and subranges therebetween, for a signal to noise ratio of greater than about 50. Certain exemplary embodiments can be continue to generate stable quantitative data based on a daily calibration using a single known sample.

Using an exemplary embodiment, NF3 was analyzed at various concentrations. Via these experiments, certain questions were answered, including:

A. How stable was the FTMS system when performing the analysis?

B. What was the amount of change that could be detected reproducibly by the FTMS system?

C. How often would the FTMS system require calibration?

To perform the experiments, two gas cylinders were used. One contained a known 20% NF3 mixture; the second was pure nitrogen. Two mass flow controllers were utilized. Controller 1 had a full range of 5000 sccm (standard cubic centimeters/minute), and controller 2 had a full range of 100 sccm. Due to the large difference in flow ranges of the two controllers, it was decided to manipulate the NF3 concentration by changing its flow rate rather than adjusting the diluent N2 gas flow rate. Since mass flow controllers are often inaccurate below 2% of their rated capacity, controller 1 was used for N2 at a flow rate of 150 sccm (3% of rated capacity). Controller 2 was used for the NF3 mixture. The flow rate of controller 2 was adjusted between 50 sccm and 3.9 sccm. This corresponds to NF3 concentrations in the sample between 5.0% and 0.5%

The two gases were hooked to the flow controllers, controller 1 was at room temperature. Controller 2 was maintained at a temperature of about 75 degrees C. The output of the gas mixing device was attached to an outer bulkhead connection for an FTMS sampling valve. The sample gas passed through the valve and exited via an exit bulkhead connection. The sample then flowed via a ⅛ inch Teflon tube from the exit bulkhead to a working hood, where it was exhausted.

An NF3 concentration of 5.0% was maintained for the first 2 hours. After which the NF3 concentration was adjusted to 4.5% for 1 hour, then 4.0% for 1 hour, then 3.0% for 1 hour, then 2.0% for 1 hour, then 1.0% for 1 hour, then 0.5% for 1 hour, then 5.0% for 30 minutes. This data was used to construct a calibration curve. Then a number of random flow rates for NF3 were chosen as given in Table 2. Each of these flow rates was maintained for 10 minutes. This data was used to calculate a measured NF3 concentration that was compared with the predicted NF3 concentration. Lastly the NF3 concentration was reset to 5.0% and data collected for approximately an additional 8 hours.

Certain exemplary embodiments of the FTMS system have the ability to generate many different types of data files. In the experiment, five data files were generated automatically. One file was a peak measurement file that recorded raw peak heights for requested quantitation peaks, in this case mass 51.9998 and 70.9982 for NF3. A second file recorded other relevant parameters in a comma delimited text file. These parameters included the sample pressure as measured by the ion pump current reading, the mass position of the 52 and 71 peaks, and the temperature of the valve and the sensor. A third type of file recorded the peak detected mass spectrum for each spectrum processed. The fourth file type archived the state of the instrument status window at the moment the experiment concluded. The last file was an ASCII representation of the last sample introduction peak, which allowed for examination of peak shape and pump response. All of these files were updated every 30 seconds when a new data point was taken. All these files were stored on the workstation in a data sub-directory corresponding to the experimental method used to acquire the data.

Based on the experiments, the following Table 4 illustrates the stability of the experimental FTMS system when performing the analysis, thus addressing the first question.

TABLE 4

| % NF3 | Mean Intensity | Median intensity | Std. Dev. | RSD (%) | Signal/Noise |
|---|---|---|---|---|---|
| 5 | 6334 | 6329 | 85.2 | 1.3 | 159 |
| 4.5 | 5527 | 5528 | 91.1 | 1.6 | 138 |
| 4.0 | 4917 | 4920 | 59.8 | 1.2 | 123 |
| 3.0 | 3596 | 3601 | 52.9 | 1.5 | 90 |
| 2.0 | 2335 | 2334 | 40.0 | 1.7 | 58 |
| 1.0 | 1061 | 1061 | 30.5 | 2.9 | 27 |
| 0.5 | 453 | 452 | 24.1 | 5.3 | 11 |

Figure 12:
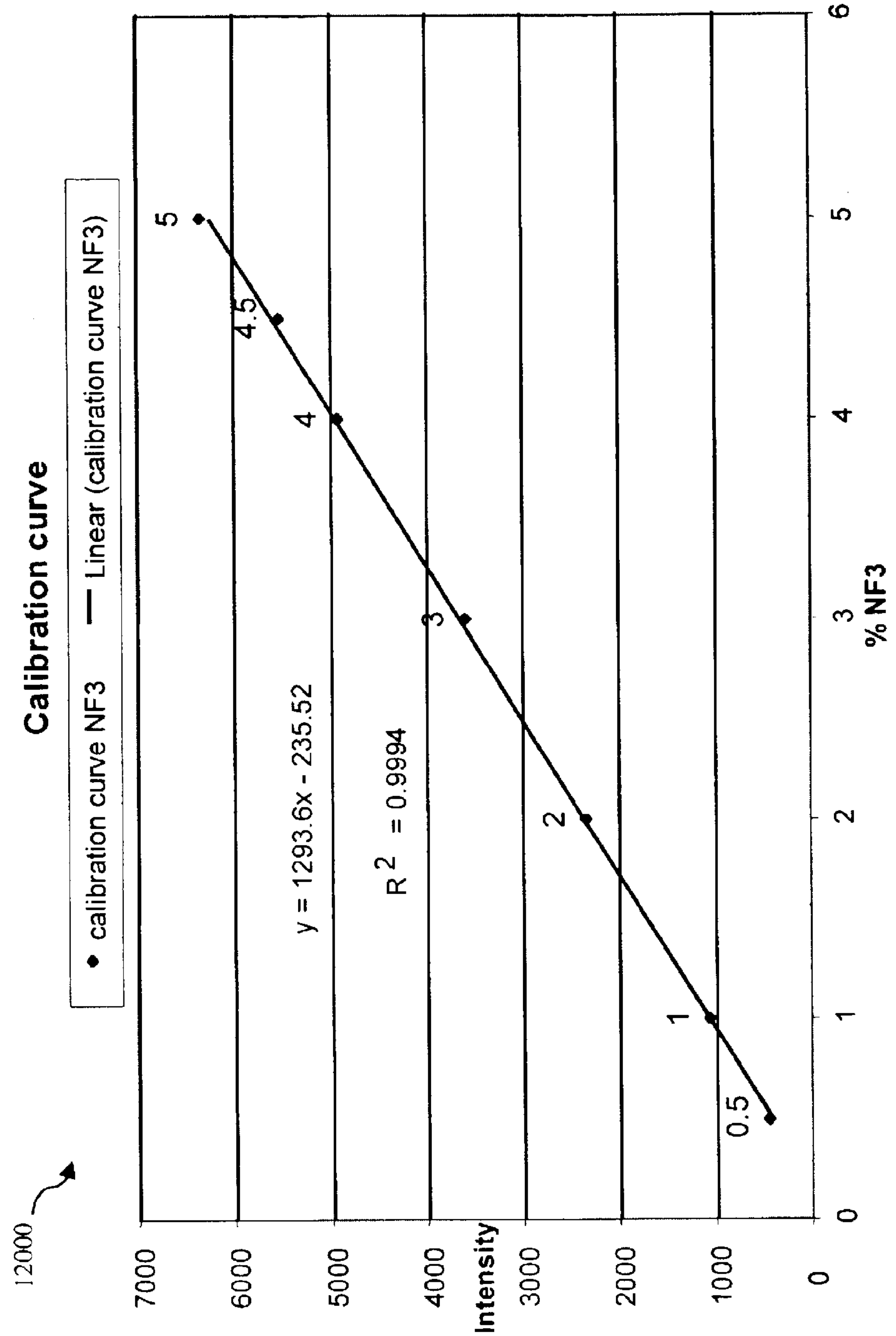
FIG. 12 is an exemplary plot of intensity versus concentration.

FIG. 12 is an exemplary plot 12000 of intensity versus concentration, in this case plotting the data of Table 4 as a calibration curve, in which intensity is dependent upon percent NF3.

Some of the early experimental data showed the exemplary FTMS system took about 1 hour to reach stability, after which it maintained that stability for over 10 hours. Also at the end of seven hours the FTMS system sensitivity was within 4% of where it was when the run began.

Figure 13:
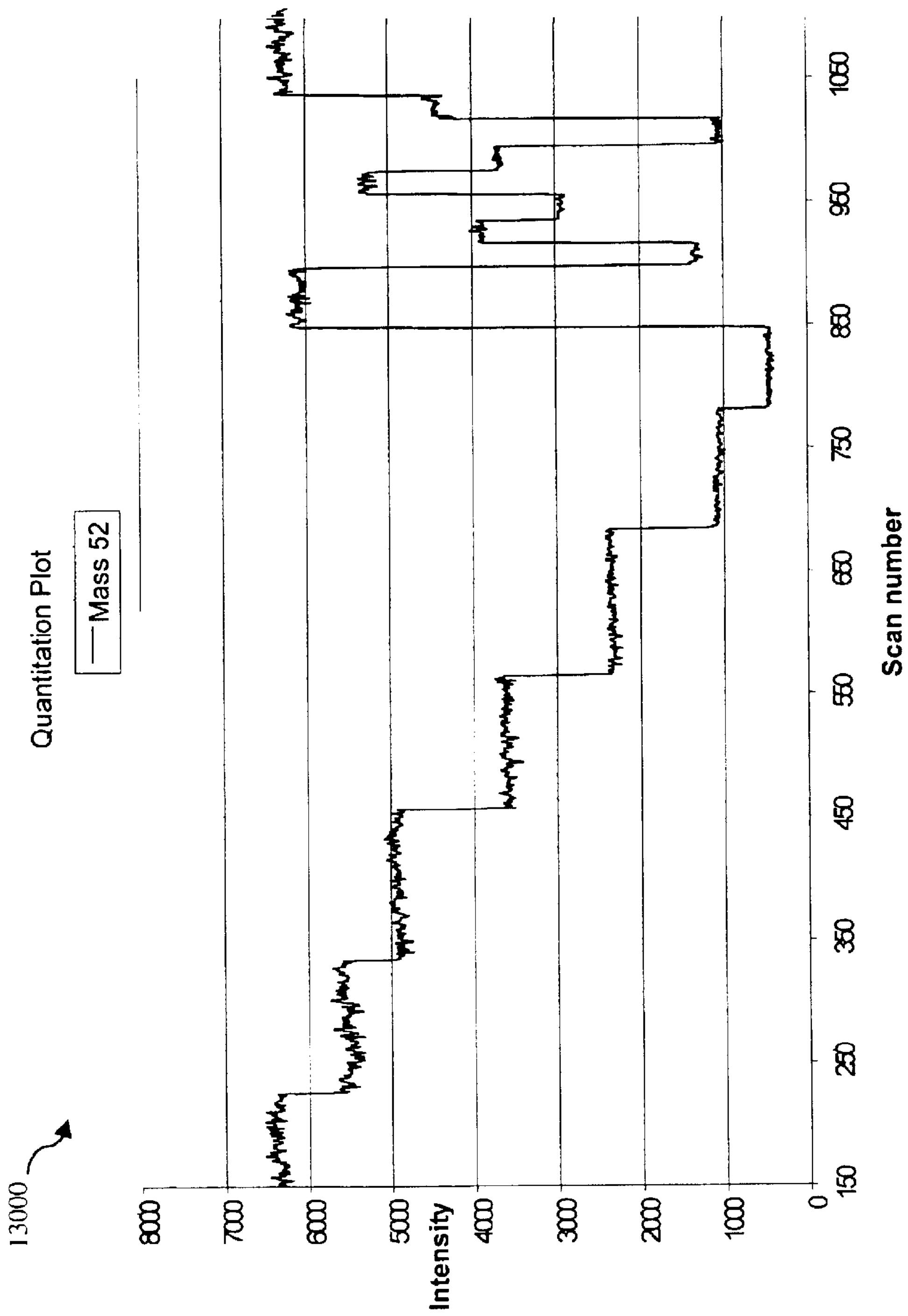
FIG. 13 is an exemplary plot of intensity versus scan number.

To address the second question, data taken during the experiment show that a 10% relative change was easily detectable between 1% and 5% NF3 absolute concentration. In addition, examination of the very consistent standard deviations and RSD's obtained showed that at a 99% confidence level a 5% relative concentration change would be detectable. Because certain exemplary embodiments of an FTMS system can work on the basis of the number of molecules introduced, these same detection values can be applied to a 20% concentration target. At that level, the difference between 19% and 20% can be readily detectable. The response of the utilized FTMS system was nearly instantaneous depending only on the flow rate of sample and the analysis rate (2 points per minute here). This is illustrated in FIG. 13, which is an exemplary plot 13000 of intensity versus scan number.

Running a series of known concentrations over 10 minute intervals performed a quick check on the usefulness of the experimental method. This data appears between scans 900 and 1050 on the plot of FIG. 13, and is also summarized in Table 5.

TABLE 5

| NF3 flow rate mL/Min | Actual % NF3 | Calc. % NF3 | RSD % | 99% Confidence Concentration Intervals | |
|---|---|---|---|---|---|
| 10 | 1.25 | 1.21 | 3.51 | 1.28 | 1.14 |
| 30 | 3.33 | 3.18 | 1.33 | 3.26 | 3.11 |
| 22 | 2.56 | 2.44 | 0.91 | 2.49 | 2.40 |
| 42 | 4.38 | 4.24 | 1.35 | 4.35 | 4.13 |
| 28 | 3.15 | 3.02 | 0.85 | 3.07 | 2.97 |
| 8 | 1.01 | 0.99 | 3.76 | 1.05 | 0.93 |
| 34 | 3.70 | 3.60 | 1.73 | 3.73 | 3.49 |
| 50 | 5 | 5.00 | 1.28 | 5.13 | 4.89 |

In answer to the third question, as shown by the stability of the analysis, RSD's of about 5% were maintained using daily calibration of a single known sample. Day-to-day sensitivity variations during the approximately 2 weeks the exemplary experimental FTMS system was exposed to the samples varied by no more than 15%.

Thus, the data gathered during the NF3 experiments showed that the certain exemplary embodiments of an FTMS system can generate substantially stable quantitative information.

In certain exemplary FTMS systems, both qualitation and quantitation can be provided automatically. For example, using a known sample comprising Butane at about 25 ppm in Nitrogen, a base peak at 43.0548 m/z, as well as other fragment peaks can be determined, along with the relative intensities of each peak, thus forming a Butane pattern characterized by a collection of masses and intensities. Similarly, intensity data can be collected for other concentrations of Butane to develop a substantially linear calibration curve. Such a calibration curve can be based upon a fixed known sample temperature, a fixed known differential pressure measured across the sample valve (e.g., the differential between the sample inlet pressure and the ion cell), and operation of the exemplary FTMS system within the linear range of the ionization current flux.

This mass and intensity data can be collected and stored in, for example, a database. In certain exemplary FTMS systems, via such a database of mass and intensity data for a wide variety of known samples, unknown samples can be automatically identified (i.e., qualitated) as well as quantitated. For example, if any unknown sample, even a sample containing a large number of species, presents peaks having a substantially identical pattern to that of Butane (including its base and fragment peaks), certain exemplary embodiments can recognize the pattern in the unknown sample as corresponding to Butane, and thereby predict with a high predetermined degree of certainty that Butane is present in the sample. Utilizing the calibration curve developed for Butane from the intensity vs. concentration data, the quantity of Butane present in the unknown sample can be estimated, within a predetermined confidence interval. If the unknown sample is collected at a different temperature or differential pressure than that at which the calibration curve was developed, a new calibration curve can be estimated using the Ideal gas law.

In certain exemplary FTMS systems, semi-quantitative measurements can be automatically performed relatively independently of species, and without accessing or needing previously-generated calibration curves or data. For example, as shown in Table 6, for a variety of different light gases, each of which was present in separate samples of Nitrogen at a 25 ppm concentration, an exemplary FTMS system generated similar intensity signals and signal to noise ratios. Thus, unknown samples can be identified and at least semi-quantitiatively determined without utilizing a calibration curve or data.

TABLE 6

Compound Independent Semi-Quant

| Species | Signal Base Peak Mass (m/z) | Noise | Signal Intensity | Signal/Noise |
|---|---|---|---|---|
| Carbon Dioxide | 43.9898 | 12 | 653 | 54 |
| Butane | 43.0548 | 12 | 611 | 51 |
| Acetone | 43.0184 | 12 | 637 | 53 |
| SO2 | 63.9619 | 12 | 610 | 51 |
| Ethyl Mercaptan | 46.9956 | 12 | 603 | 50 |

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or numerical range is described herein, unless clearly stated otherwise, that number or range is approximate. When any numerical range is described herein, unless clearly stated otherwise, that range includes all numbers therein and all subranges therein.

What is claimed is:

1. A method for performing repeated quantitative analysis using an FTMS, comprising a plurality of activities comprising:

from at least one predetermined sample source, automatically and repeatedly obtaining a sample;

for each obtained sample, automatically and repeatedly:

providing the sample to an FTMS;

optimizing at least one variable for the FTMS;

acquiring a plurality of outputs from the FTMS;

ascertaining an identity of at least one predominant ionic component of the sample based on the plurality of outputs;

determining a quantity of the at least one predominant ionic component; and ejecting the at least one predominant ionic component from a detection region of the FTMS.

2. The method of claim 1, further comprising:

determining a number of repetitions for said obtaining activity.

3. The method of claim 1, further comprising:

obtaining a user-chosen number of repetitions for said obtaining activity.

4. The method of claim 1, further comprising:

determining when to cease said obtaining activity.

5. The method of claim 1, further comprising:

determining a number of repetitions for said activities involving the obtained sample.

6. The method of claim 1, further comprising:

determining when to cease said activities involving the obtained sample.

7. The method of claim 1, said acquiring activity further comprising:

applying a trapping plate voltage to at least one trapping plate of the FTMS.

8. The method of claim 1, said acquiring activity further comprising:

measuring the plurality of outputs from the FTMS.

9. The method of claim 1, further comprising:

transforming the plurality of outputs from time domain to frequency domain.

10. The method of claim 1, further comprising:

recording the identity of the at least one predominant ionic component of the sample.

11. The method of claim 1, further comprising:

recording the quantity of the at least one predominant ionic component of the sample.

12. The method of claim 1, further comprising:

communicating the identity of the at least one predominant ionic component of the sample.

13. The method of claim 1, further comprising:

communicating the quantity of the at least one predominant ionic component of the sample.

14. The method of claim 1, further comprising:

for each obtained sample, automatically clearing an identity of any previously determined predominant ionic components.

15. The method of claim 1, further comprising:

for each obtained sample, automatically clearing a value of any previously determined ejection voltages.

16. The method of claim 1, wherein said ascertaining activity is based on the plurality of outputs from the FTMS.

17. The method of claim 1, wherein the quantity provided by said determining activity has a relative standard deviation of about 5 percent.

18. The method of claim 1, wherein the quantity provided by said determining activity has a relative standard deviation of about 5 percent at a 99% confidence level.

19. The method of claim 1, wherein the quantity provided by said determining activity has a relative standard deviation of less than about 5 percent at a 99% confidence level.

20. The method of claim 1, wherein said determining activity is based on the plurality of outputs from the FTMS.

21. A method for performing quantitative analysis using an FTMS, comprising:

for a predetermined sample, automatically and repeatedly for a predetermined number of iterations:

optimizing at least one FTMS variable;

acquiring a plurality of FTMS outputs; and ascertaining an identity of at least one predominant ionic component of the sample based on the plurality of outputs; and determining a quantity of the at least one predominant ionic component; and ejecting the at least one predominant ionic component from a detection region of the FTMS.

22. A method for performing quantitative analysis using an FTMS, comprising:

for a predetermined sample, automatically:

optimizing at least one FTMS variable;

acquiring a plurality of FTMS outputs; and ascertaining an identity of each of a plurality of ionic components of the sample based on the plurality of outputs; and determining a quantity of each of the plurality of ionic components.

23. A method for performing quantitative analysis using an FTMS, comprising:

for a predetermined sample, automatically:

optimizing at least one FTMS variable;

acquiring a plurality of FTMS outputs; and ascertaining an identity of at least one of a plurality of ionic components of the sample based on the plurality of outputs; and determining a quantity of the at least one of the plurality of ionic components.

24. A machine-readable medium storing instructions for activities comprising:

for a predetermined sample, automatically:

optimizing at least one FTMS variable;

acquiring a plurality of FTMS outputs; and ascertaining an identity of each of a plurality of ionic components of the sample based on the plurality of outputs; and determining a quantity of each of the plurality of ionic components.

* * * * *